United States Patent [19]

Schmitt

[11] Patent Number: 4,756,196
[45] Date of Patent: Jul. 12, 1988

[54] FLOW MEASURING APPARATUS

[75] Inventor: Rolf Schmitt, Frankenthal, Fed. Rep. of Germany

[73] Assignee: RMG Electronic GmbH, Frankenthal, Fed. Rep. of Germany

[21] Appl. No.: 872,905

[22] Filed: Jun. 11, 1986

[30] Foreign Application Priority Data

Jul. 3, 1985 [DE] Fed. Rep. of Germany ....... 3523760

[51] Int. Cl.$^4$ ............................................... G01F 1/32
[52] U.S. Cl. ................................................. 73/861.24
[58] Field of Search ............ 73/861.22, 861.23, 861.24

[56] References Cited

U.S. PATENT DOCUMENTS

| | | | |
|---|---|---|---|
| 3,680,375 | 8/1972 | Joy et al. | 73/861.23 |
| 4,069,708 | 1/1978 | Fossell, Jr. | 73/861.24 |
| 4,312,236 | 1/1982 | Mahany et al. | 73/861.22 |
| 4,312,237 | 1/1982 | Thorne et al. | 73/861.22 |

Primary Examiner—Herbert Goldstein
Attorney, Agent, or Firm—Antonelli, Terry & Wands

[57] ABSTRACT

An apparatus for measuring the flow rate of fluid media has a rod-like interfering body rigidly arranged in the flow and which has a cylindrical flow-against surface on which periodically separating eddies form, as well as a device with a sensor for recording the eddy separating frequency which is dependent on the flow rate. In order to obtain a proportional dependence between the flow and separating frequency over a wide Reynolds number range in the case of a low inherent flow resistance, the interfering body is symmetrically bent downstream and to either side from its top. To avoid interactions between the two vortex paths which form, a diverting surface is positioned behind the interfering body in the plane thereof.

16 Claims, 3 Drawing Sheets

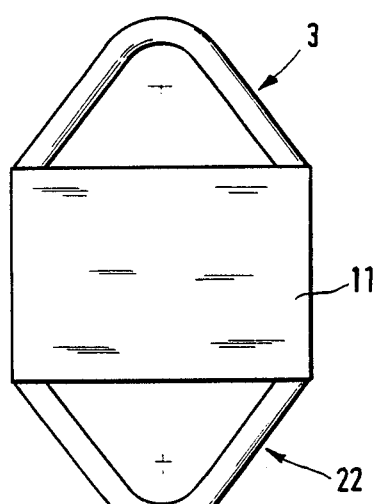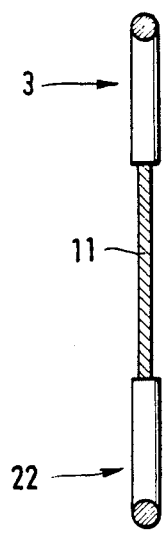
FIG. 6     FIG. 7
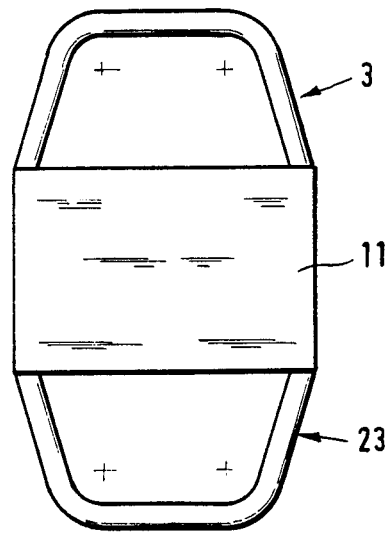
FIG. 8

FLOW MEASURING APPARATUS

BACKGROUND OF THE INVENTION

The present invention relates to an apparatus for measuring the flow rate of fluid media with a rod-like interfering or dislocating body rigidly arranged in the flow having a cylindrical flow-against surface on which periodically separating eddies form and a device with a sensor for recording the eddy separating frequency which is dependent on the flow rate.

Apparatuses of the present construction are based on the principle of the Karman votex or eddy path. The phenomenon was discovered by Karman on cylindrical rods and was investigated from the flow standpoint. In the case of turbulent flow on the blind side of the cylindrical rod eddies form on opposte sides, breaking away or separating alternately on the two sides and migrating downstream. The eddy separating frequency can be measured with sensors of different types, e.g. pressure transducers, hot-wire sensors, etc. The eddy separating or breaking away frequency is a measure of the flow rate of the fluid medium, siad effects occurring in both gas and liquid flows. In a certain range of the Reynolds number the separating frequency is proportional to the flow, so that in the case of corresponding dimensioning and arrangement of the interfering body in the flow, a troublefree and precise measurement is possible.

Outside the aforementioned Reynolds number range dynamic distrubances from the flow are superimposed on eddy or vortex formation, so that in said ranges there is no longer any proportionality between the flow and the separating frequency. In order to be able to still utilize this effect for flow measurement purposes in these ranges, particularly in the case of high Reynolds numbers, in the past attempts have been made to optimize the shape of the interfering body in such measuring equipment so as to obtain an at least reproducible dependence of the separating frequency on the flow rate over a larger Reynolds number range. Thus, it is known to provide the interfering body in the form of a half circular cylinder with a cylindrical flow-against surface or to use a prismatic interfering body, which extends downwards from an upstream linear edge with planar flow surfaces (DE-OS No. 20 38 569). The increased flow resistance of such an interfering body is to be reduced by following assemblies, such as transversely positioned discs and the like. It is also known (U.S. Pat. No. 3,116,639) to replace the solid cylindrical interfering bodies by those having a partly elliptical flow-against surface and to record the breaking away or separating frequency by an oscillatably mounted sensor positioned in aligned manner behind the interfering body. It is also known (German Patent No. 19 26798) to arrange in the flow a plate-like baffle surface substantially at right angles thereto and which has a symnmetrically fixed, downstream extending stabilizing surface. All the known constructions suffer to a greater or lesser extent from the disadvantages referred to hereinafter.

A considerable pressure loss results from the shaping of the interfering body. In addition, the effective pipe cross-section is considerably limited by the interfering body. Measurement is impaired by pulsations in the flow, which are caused by flow generators, pipe bends, assemblies such as valves and the like, because the flow profile is disturbed and in certain circumstances this can lead to brief breaking away effects in the vortex path. This once again leads to measuring errors. In order to avoid this to a certain extent, it is necessary to provide a long intake section with straightening blades in order to obtain a uniform speed profile in the case of turbulent flow. For many measuring functions it is not possible to realise such intake sections. The shape and dimensioning of the interfering bodies lead to wall influences, which also falsify the measured result. From this is derived the requirement to construct the measuring body size in a particular ratio to the pipe diameter, so that a corresponding number of interfering bodies must be made available for the different nominal pipe bores.

SUMMARY OF THE INVENTION

The problem of the present invention is to provide an interfering body which, in a wide Reynolds number range, has a proportional dependence between the flow range and the separating frequency and with low flow resistance is not sensitive to the superimposing of dynamic flow processes.

On the basis of the aforementioned apparatus with a rod-like interfering body having a cylindrical flow-against surface, this problems is solved in that the interfering body is symmetrically bent from its top in the downstream direction and to both sides.

In the case of the interfering body constructed according to the invention, it can in the simplest case be a thin semicylindrical rod, which is bent in the flow direction to either side from the top thereof. Naturally such a rod has a very limited flow resistance, because it only opposes the flow with cylindrical small diameter surfaces. Practical tests have shown that in the case of such an interfering body there is a completely satisfactory eddy or vortex separation over a large Reynolds number range and consequently a directly proportional dependence between the separating frequency and the flow rate. It has also been found that the eddy separation is also not or only insignificantly influenced by superimposed pulsations, so that a completely satisfactory measurement is still possible. This particularly applies to the area behind the top of the interfering body, where a quiet flow zone forms, where the flow rate is approximately zero and there is essentially only an oscillation at right anles to the flow direction. The sensor is therefore preferably also arranged in said area behind the top of the interfering body.

According to a further development of the invention behind the interfering body there is provided a diverting surface located in the plane thereof and which in the simplest case can be constructed as a thin plate. This diverting surface leads to the deflection of the flow behind the interfering body and to a calming of the flow. In particular an alternate influencing of the two vortex paths, which can occur in the case of superimposed pulsations is avoided. It has also been found that such an interfering body leads to completely satisfactory measurement results even without an intake section and straightening blade. It can even be used as a probe for measuring dynamic flow processes in the outflow region of fans, pumps or the like. Moreover the quality of the measurement is largely independent of the sensor system used and it is possible to employ thermistors, wire strain gauges, pressure transducers, vibration sensors or sound recorders (for air flows). It is also possible to successively connect one or more transducers. It is also possible to successively arrange several interfering bodies in order to permit a measurement of the flow pattern in the flow direction. It is finally possible to arrange several interfering bodies over the cross-section of a flow and to record the vectorial speed distribution in a flow profile.

According to a preferred embodiment at the top of the interfering body it has a small radius of curvature, so that there is a type of cylindrical flow-against surface at right angles to the flow and this in turn reduces the flow resistance and ensures a completely satisfactory eddy separation. The radius of curvature can roughly be three to ten times the radius of the cylindrical flow surface.

In another embodiment, the interfering body is provided at its top with a linear portion perpendicular to the flow-against direction and to which are then connected the rearwardly bent postions.

The downstream bent portions of the interfering body are appropriately also linear, the angle thereof with respect to the flow direction being between 10° and 80°. Such an interfering body can be produced in simple manner by bending a cylindrical rod about a cylindrical bearing or support. It can also be advantageous in place of this and for further improving the oscillating or vibrating stability to give the interfering body a parabolic construction.

According to a further advantageous development of the invention the diverting surfcae on its downstream side is connected to the ends of the downwardly bent portions of the interfering body. Thus, the interfering body and diverting surface form a subassembly, which can be placed without difficulty in a pipeline and can also be fitted as a test probe for temporary measuring operations.

The diverting surface is preferably constructed as a thin plate with an appropriately rectangular cross-section. On the edge thereof connected to the interfering body it has the same length as the corresponding transverse extension of the interfering body. The plate is less thick than the flow-against cross-section of the interfering body.

The above embodiment also provides the possibility of arranging the sensor directly on the diverting surface or in a window thereof, e.g. in the form of a lug, which is connected to the diverting surface on either side by means of wire strain gauges. This leads to a vibratable or oscillatable sensor, whose transverse oscillations or vibrations are recorded by means of the wire strain gauges. This provides a complete assembly formed from interfering body, diverting surface and sensor, which greatly simplifies insertion and installation.

For special measuring problems, namely for the detection of return flows, it is possible to provide downstream of the interfering body a further interfering body with a reverse orientation, the two interfering bodies preferably being interconnected by the diverting surface. This makes it possible without any conversion work to carry out a flow measurement in both flow directions by means of a single component and a single sensor.

BRIEF DESRIPTION OF THE DRAWINGS

The invention is described in greater detail hereinafter relative to non-limitative embodiments and the attached drawings, which show:

FIG. 1, a detail from a pipe with a built-in interfering body and a sensor in perspective view.

FIG. 2, a horizontal section through the pipe according to FIG. 1.

FIG. 3, a larger scale view of the interfering body according to FIGS. 1 and 2.

FIG. 4, a view of the interfering body of FIG. 3 displaced by 90°.

FIG. 5, a view corresponding to FIG. 3 of another embodiment of the interfering body.

FIG. 6, a view corresponding to FIG. 3 of another embodiment of the interfering body.

FIG. 7, a view of the interfering body of FIG. 6 displaced by 90°.

FIG. 8, a view corresponding to FIG. 6 of another embodiment of the interfering body.

DETAILED DESCRIPTION OF THE PREFERRED EMBODIMENTS

Figure 1:
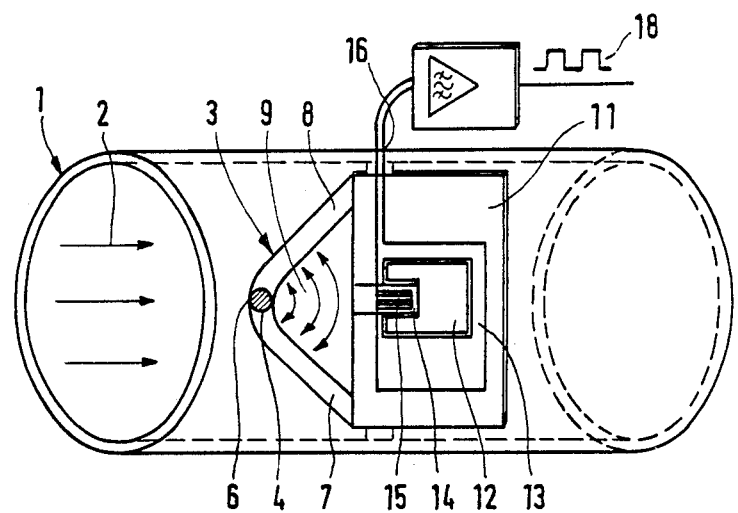

FIG. 1 shows a detail from a circular cylindrical pipe 1, which acts as a guide for a flowing, fluid medium (gas or liquid), the flow directions being indicated by direction arrows 2.

Figure 2:
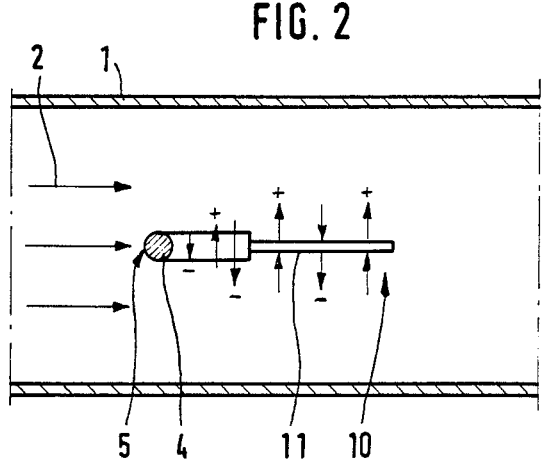

An interfering body 3 is inserted in a fixed and immovable manner in pipe 1 and in the represented embodiment it has a cylindrical cross-section 4 and consequently also a partly cylindrical flow-against surface 5 (FIG. 2). The flow body has a top 6 located in the flow axis and from which downward bending takes place to either side in the flow direction. In the represented embodiment the rearwardly bent portions 7 and 8 are linear. Interfering body 3 is located with its top 6 and bent down portions 7, 8 in a flow-parallel plane and extends with said portions roughly over the entire cross-section of pipe 1. This interfering body can e.g. comprise a small diameter cylindrical rod, which is produced by central bending about a cylindrical abutment.

Behind the interfering body and particularly behind its top 6, eddies form in zone 9 and are periodically broken away or separated on either side of the interfering body and as is indicted by vectors in FIG. 2.

To prevent a reciprocal influencing of the two eddy or vortex paths, behind the interfering body 3 is provided a diverting surface 10 in the form of a thin small plate 11, which separates the two paths from one another and in the represented embodiment is fixed to the free ends of portions 7, 8, or interfering body 3.

In the embodiment shown in FIGS. 1 and 2, the sensor for recording the separating frequency is an oscillatable or vibratable lug 12, which is arranged within a window 13 of plate 11 and is vibratably mounted on its upstream edge by means of a foil-like suspension. Lug 12 follows the pressure pulses alternately acting from the eddies and vibrates at right angles to the flow directions. The oscillating or vibrating frequency is recorded by means of bonded on wire strain gauges 15, which convert the expansions produced by the vibration into electrically measurable resistance changes, which are recorded by means of electrical connections 16 and are converted by an evaluation electronics 17 into a digital pulse sequence 18.

Figure 3:
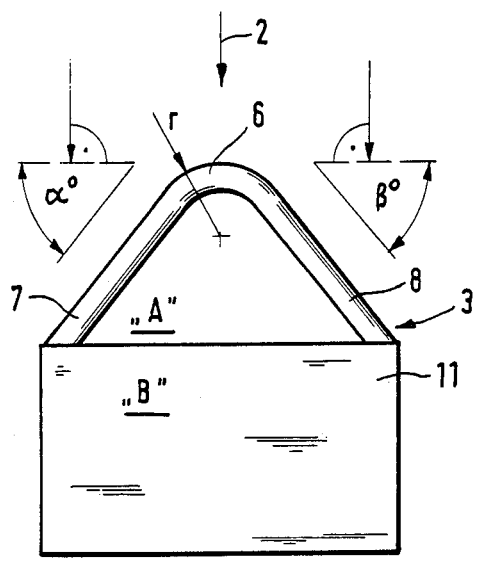
Figure 4:
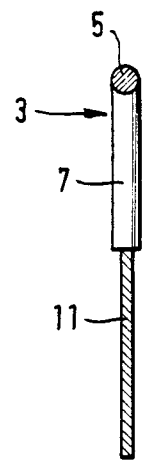

FIGS. 3 and 4 show the interfering body according to FIGS. 1 and 2 on a larger scale. As stated, it is made from a rod having a cylindrical cross-section and a relatively small diameter. The radius of curvature r in the represented embodiment is roughtly five times the cylinder radius of the rod. The rearwardly bent portions 7, 8, reproduced in linear form in the drawing can instead by given a parabolic construction together with the top 6. In the represented embodiment portions 7, 8 have an angle $\alpha = \beta$, which is in this case approximately 45° with respect to a plane at right angles to flow direction 2. To the free ends of portions 7, 8 is fixed the plate 11 acting as the diverting surface and which, as is particularly shown in FIG. 4, has a significantly smaller thickness than the diameter of interfering body 3.

Figure 5:
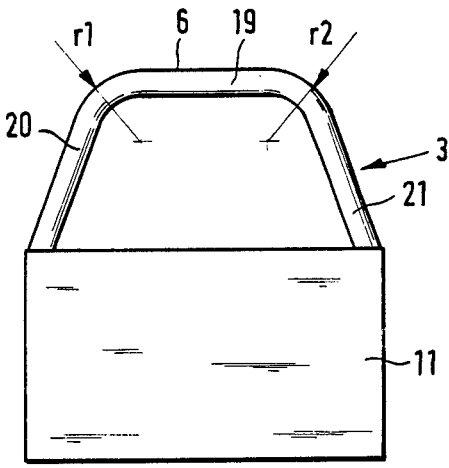

The embodiment of FIG. 5 differs from that of FIGS. 3 and 4 in that the interfering body 3 is provided in the vicinity of top 6 with a linear portion 19, to which are connected the downstream symmetrically bent portions 20, 21. The radii of curvature $r_1$ and $r_2$ between portions 20, 21 and the linear portion 19 are identical. Hereagain, the plate 11 forming the diverting surface is fixed to the free ends of portions 20, 21. The embodiment according to FIGS. 6 and 7 differs from that of FIGS. 3 and 4 only in that on the side facing interfering body 3 is fitted an interfering body 22 of identical contour and in opposite orientation. In the same way, FIG. 8 shows an embodiment modified compared with FIG. 5 with an oppositely oriented interfering body 23, the two bodies being interconnected by means of plate 11.

What is claimed is:

1. An apparatus for measuring the flow rate of fluid media with a rod-like interfering body rigidly arranged in the flow and which has a cylindrical flow-against surface, on which are formed periodically separating eddies, and a device with a sensor for recording the eddy separation frequency which is dependent on the flow rate, wherein, starting from an upstream top, the interfering body is symmetrically bent downstream to either side, said wherein the portions of the interfering body which are bent downstream have a linear configuration.

2. An apparatus according to claim 1, wherein a diverting surface located in the plane of the interfering body is positioned behind the latter.

3. An apparatus according to claim 1 or 2, wherein the top of the interfering body has a small radius of curvature.

4. An apparatus according to claim 3, wherein the radius of curvature is three to ten times the radius of the cylindrical flow-against surface.

5. An apparatus according to claim 1 or 2, wherein at its top, the interfering body has a linear portion at right angles to the flow direction and connected thereto portions bent downstream in symmetrical manner.

6. An apparatus according to claim 2, wherein on its upstream side, the diverting surface is connected to the ends of the bent portions of the interfering body.

7. An apparatus according to claim 2, wherein the diverting surface is constructed as a thin plate, whose thickness is less than the flow-against cross-section of the interfering body.

8. An apparatus according to claim 7, characterized in that the plate is rectangular.

9. An apparatus according to claim 2, wherein the sensor is arranged on the diverting surface.

10. An apparatus according to claim 9, wherein the diverting surface aligned with the top of the interfering body has a vibratable or vibratably suspended lug and the sensor is constituted by at least one wire strain gauge connecting the lug to the diverting surface.

11. An apparatus according to claim 10, wherein the lug is arranged in a window of the diverting surface.

12. An apparatus according to claim 1, wherein the angle of the bent portions is between 10° and 80° relative to the flow direction.

13. An apparatus for measuring the flow rate of fluid media with a rod-like interfering body rigidly arranged in the flow and which has a cylindrical flow-against surface, on which are formed periodically separating eddies, and a device with a sensor for recording the eddy separation frequency which is dependent on the flow rate, wherein starting from an upstream top, the interfering body is symmetrically bent downstream to either side, and wherein the interfering body has an overall parabolic construction.

14. An apparatus according to claim 13, wherein the sensor is arranged directly behind the top of the interfering body.

15. An apparatus according to any one of the claims 1 and 13, wherein an identical interfering body with the reverse orientation is provided downstream of the first interfering body.

16. An apparatus according to claim 15, wherein the two interfering bodies are connected by a diverting surface located in the plane of the interfering bodies and positioned between the latter.

* * * * *